United States Patent [19]
Kim et al.

[11] Patent Number: 5,324,375
[45] Date of Patent: Jun. 28, 1994

[54] METHOD OF PREPARING A SHOULDER BLADDER OF A MOLDER FOR A TIRE

[75] Inventors: Chun-Sik Kim; Young-Rok Yoon; Seong-keun Kim, all of Kwangju, Rep. of Korea

[73] Assignee: Kumho & Co., Inc., Seoul, Rep. of Korea

[21] Appl. No.: 897,130

[22] Filed: Jun. 11, 1992

[30] Foreign Application Priority Data

Jun. 11, 1991 [KR] Rep. of Korea ................ 9599/1991
Jun. 27, 1991 [KR] Rep. of Korea ............... 10808/1991

[51] Int. Cl.⁵ ..................... B29C 35/04; B29C 53/00
[52] U.S. Cl. .................................. 156/120; 156/110.1; 156/124; 156/213; 156/218

[58] Field of Search ................ 156/110.1, 120, 124, 156/130.3, 196, 213, 215, 217, 218, 222, 401, 213, 218

[56] References Cited

U.S. PATENT DOCUMENTS 4,093,014 6/1978 Tomoda et al. ..................... 152/542

Primary Examiner—Michael W. Ball
Assistant Examiner—Richard Crispino
Attorney, Agent, or Firm—Lowe, Price, LeBlanc & Becker

[57] ABSTRACT

The present invention refers to that position in which an assembling position of the shoulder bladder is connected with the expansion part thereof and stress is accumulated, and the expansion of the bladder and the assembling part are all wrapped with core-rubber composition to form a body.

4 Claims, 6 Drawing Sheets

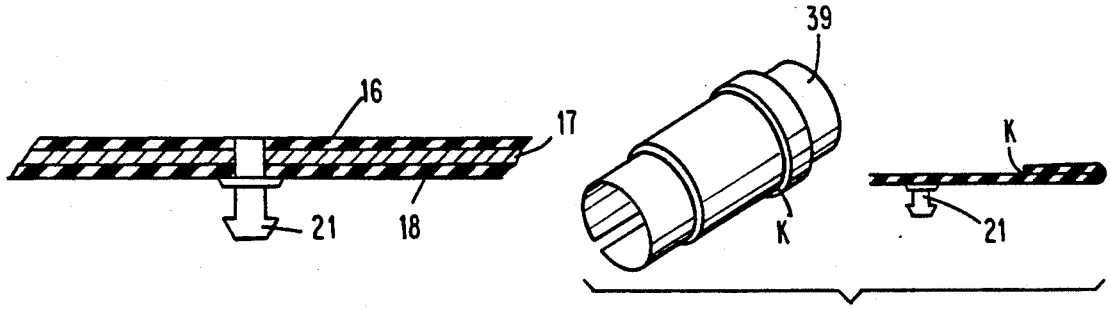
FIG. 5(a) PRIOR ART
FIG. 5(b) PRIOR ART
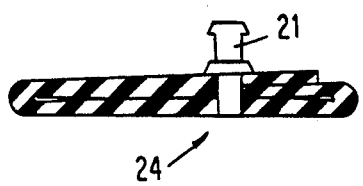
FIG. 5(c) PRIOR ART
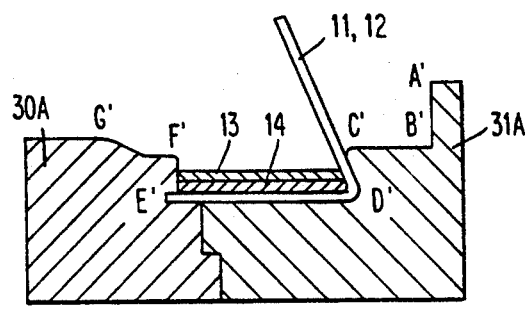
FIG. 5(d) PRIOR ART
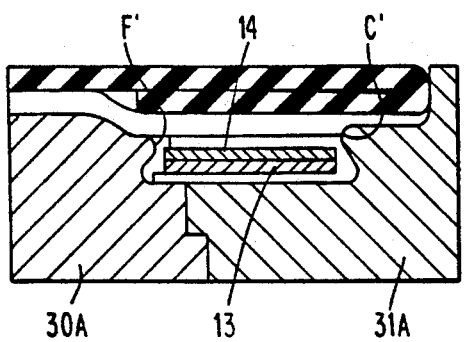
FIG. 5(e) PRIOR ART
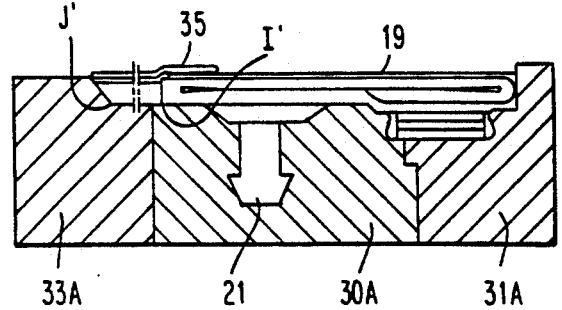
FIG. 5(f) PRIOR ART

METHOD OF PREPARING A SHOULDER BLADDER OF A MOLDER FOR A TIRE

TECHNICAL FIELD

The present invention relates generally to a method of making a shoulder bladder for a tire molder and more particularly a method of making a shoulder bladder wherein a cord-rubber sheet of a first pocket is wrapped around body-ply and rubber cover sheets, as well as metal cords, of a second pocket that forms an expandable chamber of the bladder so the first and second pockets are securely bonded to each other.

BACKGROUND ART

As shown in FIGS. 4(a) and 4(b), steel cords 13, 14 forming assembling members CDEF of a shoulder bladder used in making green tires are wrapped with a composition of rubber sheet and cord 11, 12 (hereinafter referred to as a cord-rubber composition) extending along the path defined by points G-F-E-D-C-F. The bladder includes body-ply layer 17, inflatable inner-rubber member 16 and cover-rubber layer 18. Rubber member 16, body-ply layer 17 and rubber layer 18 constitute the expandable part of the bladder which has a joint formed on the upper part thereof, as shown, for example, in FIG. 4(a). This prior bladder is manufactured by the sequential steps of FIGS. 5(a)–(f). The process illustrated in FIGS. 5(a)–(f) for manufacturing the prior bladder is as follows:

Green, uncured inner-rubber member 16, body-ply layer 17 and cover-rubber layer 18 constituting the bladder are adhered to each other in turn as illustrated in FIG. 5(a). End parts of member 16, as well as layers 17 and 18, are cut on the bias to obtain a green product. Valve 27 including stem 21 is bonded to the composite structure formed by inner rubber member 16 and layers 17 and 18, as illustrated in FIG. 5(a). One end of the slanted part of the green product is filed back on bending machine 39 to reach line K of machine 39, FIG. 5(b). Bonded stem 21 of valve 27 is folded so valve 27 of the green product extends outward for adhesion to line K to form pocket 24, FIG. 5(c).

In assembling the bladder portion extending between points CDEF, FIGS. 4(a) and 4(b), cord-rubber composition 11, 12 and steel cords 13, 14 are inserted into a cavity defined by points C'D'E'F' of body drum 30A and outer drum 31A, FIG. 5(d). Pocket 24 is turned out so valve 27 faces inward. Then parts 11–14 are inserted into body drum 30A and outer drum 31A (FIG. 5(d)) so the portion of the bladder between points C–F abuts the portions of drums 30A and 31A between points C'F'. Ring 33A is assembled thereto, as illustrated in FIG. 5(f). Rubber end portion 20 of the bladder (as illustrated in FIG. 2) abuts rubber end portion I'J', FIG. 5(f), of a folded portion of pocket 24. The surface of woven fabric 19 is wrapped to the proper width by inner tube 37. Then 140°–160° C. steam is injected to cure the green bladder.

However, the shoulder bladder manufacture by the method as described above has many defects, as follows:

First, since the portion of the bladder formed by metal cords 13, 14 is wrapped only by cord-rubber composition 11, 12, repeated expansion and deflation of the bladder during tire manufacturing frequently causes cracks and separation in the vicinity of point C', where stress is most cumulative. As shown in FIG. 1(b), inflation of shoulder bladder 1A while tire bead parts are formed and belt 8 is adhered to tread 9 causes air frequently to leak out through the separate portions of the bladder. Thereby, the position of a center line of a green tire before bladder inflation frequently differs from a center line of a manufactured green tire so there is poor adhesion of belt 8 and tread 9, resulting in a tire having poor uniformity.

The air leakage of the prior art bladder is frequently so slight that workers do not become aware of the fine crack and separation at point C of the bladder when the green tire is manufactured. The resulting tire thus frequently has an inferior rating and tire quality is greatly reduced.

Second, since the joint of the bladder body ply is disposed on the upper of the body ply, the expansion state of the bladder has a position as illustrated by dotted line 1'—1, FIG. 1(b) When the bead portion of the green tire is manufactured, the supporting force of the bladder from the interior of the bladder is fragile. Thereby a large quantity of air can get in through each position of the end portion 6A-1 of body ply 6A and a bead hump, causing great degradation to the tire quality. Furthermore, when belt 8 and tread 9 are adhered to the green tire, there is an increased probability of off-center adhesion due to the fragile supporting force of the bladder. This causes reduced tire quality and uniformity.

Third, since connection positions of the intermediate product formed of inner-rubber member 16, body-ply layer 17 and cover-rubber layer 18 constituting the bladder are only at one portion of an expanded tire circumference, the tire radius is not uniform.

Fourth, due to simultaneous curing of the surface of the bladder and the inner tube, when the inner tube is wound, a center portion in the transverse direction expands more than both ends during curing. The extent of expansion is determined by the differences of winding numbers and tension depending on each part in the transverse direction or each location along the bladder circumference. Thus, it is difficult for a bladder having equivalent transverse and circumferential dimensions to be manufactured because of dimensional variations of each bladder portion; the surface thereof can not be manufactured smoothly.

Accordingly, when a tire is manufactured by means of the molder utilizing the bladder obtained by the method described above, all qualities thereof, especially uniformity, are considerably reduced. This is because the tire quality depends on the dimensional deviations of the bladder assembled by the molder.

It is an object of the present invention to provide a new and improved method of preparing a tire molder shoulder bladder and more particularly to provide a method of preparing a bladder to overcome the structural defects of point C of the prior art occurring mostly due to cumulation of stress when the shoulder bladder is repeatedly expanded and deflated.

A further object is to provide a new and improved method of preparing a tire molder shoulder bladder capable of improving the quality of the tire and providing extended useful life thereof.

An additional object of the invention is to provide a new and improved method of preparing a tire molder shoulder bladder to prevent leakage of air filled in a green tire and to maintain pressure of the filled air during manufacture of the tire.

Another object of the invention is to provide a new and improved method of preparing a tire molder shoulder bladder used for making tires including one or more layers of radially disposed body-ply cords and two or more circumferential belts.

In accordance with a further aspect of the invention, a shoulder bladder for a tire molder is made by forming a first pocket by inserting a cord-rubber sheet superposed with a metal cord sheet into a recess of a drum assembly having a cavity. The recess is located on a bottom face of the cavity. The cord-rubber sheet is arranged so an end portion thereof extends out of the cavity. A second pocket is formed by locating on the drum assembly a structure including a rubber inner sheet superposed with a body-ply and a cover-rubber sheet so a bottom surface of the structure lies on a surface of the cavity and covers and contacts a sheet of the first pocket in the recess. The structure is folded on itself so an end of a top fold of the structure is secured to a bottom fold of the structure between the end portion of the cord-rubber sheet and a gas passage into the second pocket. The second pocket is manipulated so the recess is covered thereby. The end portion of the cord-rubber sheet is folded onto a top surface of the second pocket. A green bladder is thereby formed in the drum assembly. Cement is coated on an upper surface of the green bladder. A woven fabric is adhered tot he coated upper surface. A cover of the drum assembly is placed on the green bladder to cover the cavity to form a chamber where the materials forming the first and second pockets are located. Then air and steam are injected into the second pocket to cure the materials of the bladder so (a) the end portion of the cord-rubber sheet is bonded to the second pocket, (b) the superposed sheets forming the first and second pockets are bonded to each other and (c) the end of the structure is bonded to the bottom fold of the structure and the second pocket forms the expandable chamber of the bladder. A valve stem is adhered to the materials forming the second pocket prior to the drum cover being placed on the green bladder.

BRIER DESCRIPTION OF THE DRAWINGS

FIG. 1(a), on the left side of the Figure, is a longitudinal sectional view of a green tire molder including three uninflated bladders and, on the right side of the figure, is a mirror image of the structure on the left side with three inflated bladders during molding of a tire bead portion;

Figure 2:
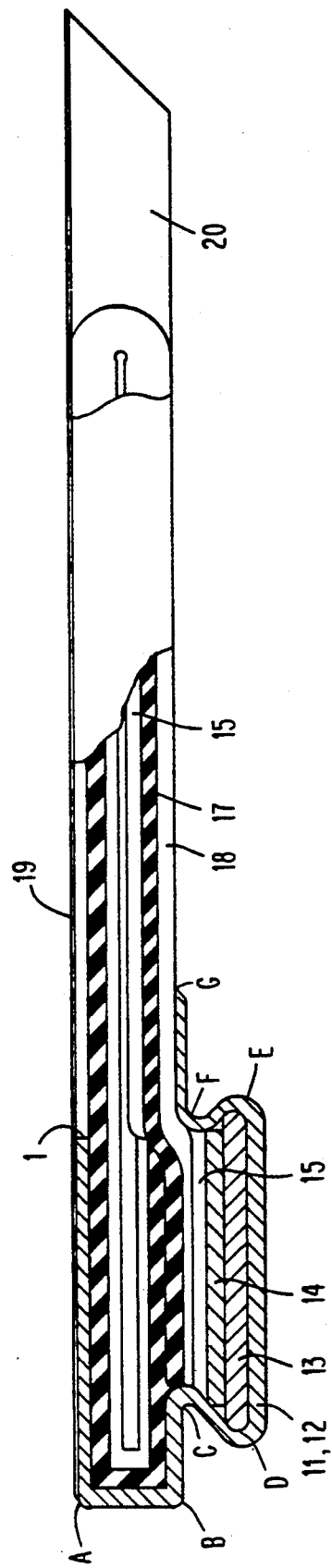
FIG. 2 is a longitudinal sectional view of an uninflated shoulder bladder made in accordance with the method of the present invention.
Figure 4A:
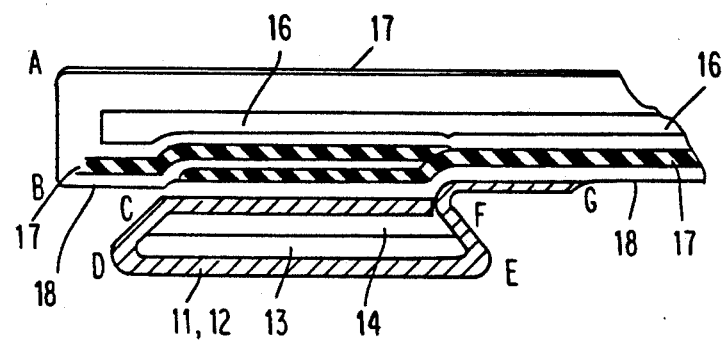
Figure 4B:
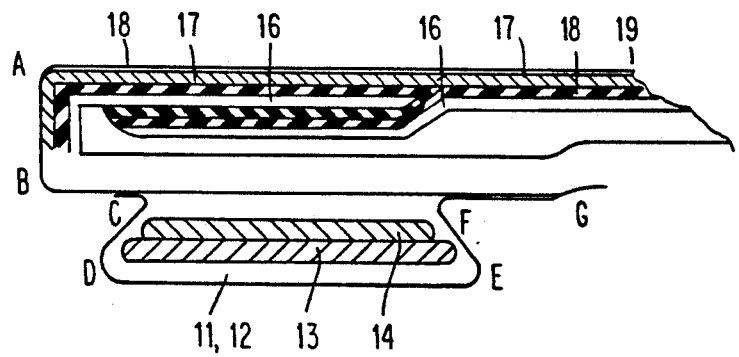

FIGS. 3(a)-(f) are schematic diagrams of steps for manufacturing the bladder of FIG. 2;

FIGS. 4(a) and (b) are longitudinal sectional views of a prior art shoulder bladder; and FIGS. 5(a)-(f) are schematic diagrams of steps for manufacturing the prior art bladder of FIGS. 4(a) and (b).

DETAILED DESCRIPTION OF THE PRESENT INVENTION

Referring to the accompanying drawings, the shoulder bladder is illustrated in FIG. 2 as including inner-rubber member 16 forming the inflatable or expandable part of the bladder, encased by body-ply layer 17 and cover-rubber layer 18. Members 16–18 are cut to the required length, are spread at regular intervals on the circumference of a bender similar to prior art bender 39 (FIG. 5), are abutted against the circumference of the bender and then are adhered together to form pocket 26, FIG. 3(c).

Figure 3A:
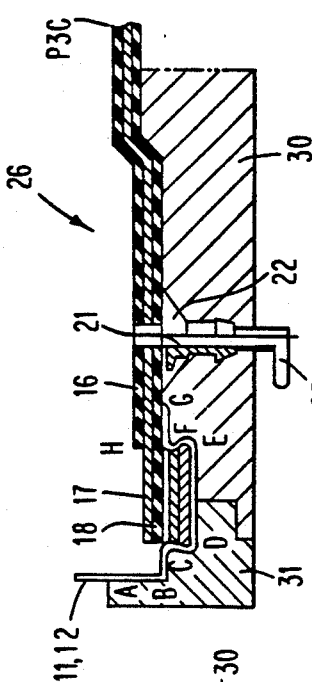
Figure 3B:
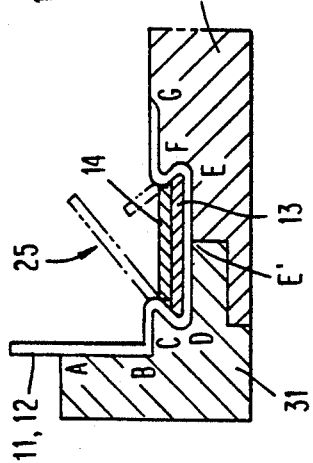
Figure 3C:
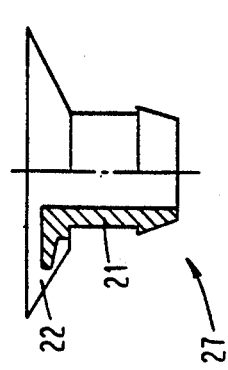
Figure 3D:
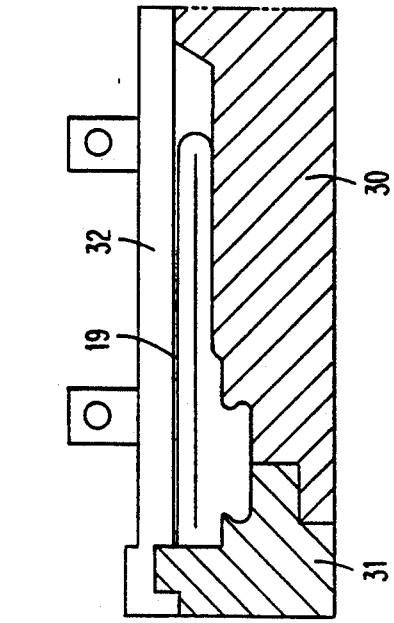
Figure 3E:
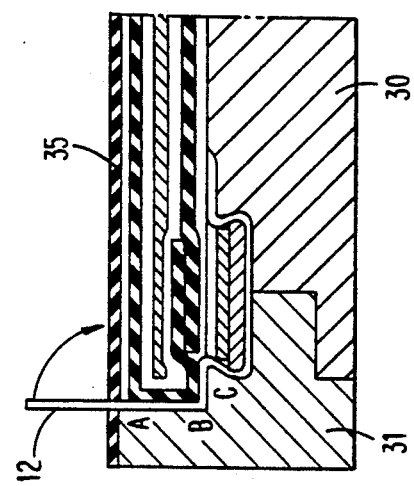
Figure 3F:
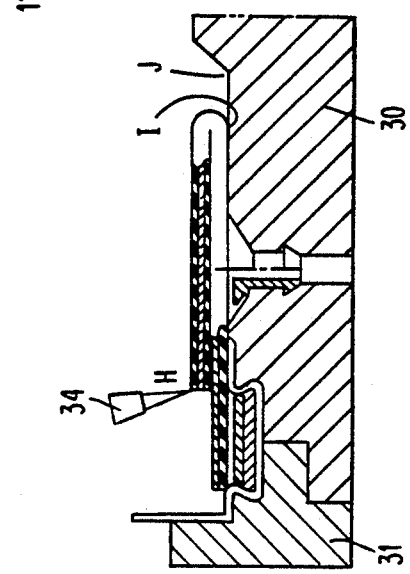

Cover drum 32, FIG. 3(f), is placed on an exposed upper surface of the bladder formed by members 16–18; the bladder is cured by injecting air at about 3.5–6.5 Kg/cm of pressure into member 16. During curing of the bladder, each part of the width and circumference is pushed equally so each part has a uniform gauge dimension necessary for the design.

Pocket 26 of the bladder is cut to the required length, is spread at regular intervals on the circumference of bender 39 and is inserted on body drum 30. Then prepared valve union 23 is assembled in the screw part of valve stem 21; the opposite end P3C, FIG. 3(c), of base surface C of pocket 26 is fixed to a defined point H by an awl and pushed to a line defined by points ABC of outer drum 31 to form the bladder cross-sectional diameter.

After cement coated on the bladder surface dries, a nylon portion of woven fabric 19 (FIG. 2) treated with adhesive is bonded to cover-rubber layer 18. Then cover drum 32 is placed on the surface of the bladder as described above. The bladder including members 16–18 is cured by injecting compressed air at a pressure of about 3.5–6.5 Kg/cm into the bladder to push the bladder surface toward the surface of cover drum 32. In response to the injected air pressure, woven fabric 19 becomes firmly adhered to cover-rubber layer 18 because the cover-rubber layer and woven fabric are pressed together, causing smooth bladder surface formation.

Referring to FIG. 3, the method of making the shoulder bladder illustrated in FIG. 2 is illustrated in more detail. The bladder-forming steps involve:

(a) Rubber is adhered to valve stem 21 of valve 27 by curing; then the bottom of the base portion of the cured rubber surface is buffed.

(b) Cord-rubber composition 11, 12 is inserted into an assembling recess defined by points CDEF on a bottom face of a cavity (extending between points A and G) of body drum 30, as illustrated in FIG. 3(b). Then steel cord 13, 14 and composition 11, 12 are spread on a bender similar to 39 (FIG. 5) and are adhered to each other to form pocket 25.

(c) Inner-rubber member 16, superposed on body-ply layer 17 and cover-rubber layer 18 constitute a structure forming the bladder and are cut to the required length, are spread at regular intervals on the circumference of the bender similar to bender, 39 (FIG. 5) and are adhered to each other to form second pocket 26.

(d) Pocket 25 is inserted into the assembling portion of the shoulder bladder, i.e., portion EE' (FIG. 3(b)) of body drum to outer drum 31 is assembled thereto, and the cord-rubber composition 11, 12 of pocket 26 is urged against side wall portion AB of outer drum 31.

(e) Pocket 26 is inserted into body drum 30 and prepared valve 27 is adhered to pocket 26 so the valve end portion is positioned at base surface C of outer drum 31.

(f) Prepared valve union 23 (FIG. 3(c)) is assembled to a screw part of valve stem 21 and the opposite end part P3C of base surface C of pocket 26 is folded back to reach line H (FIG. 3(f)), then part P3C is fixed by awl 34. Before pocket 26 is folded back, it is coated with a release agent to prevent adhesion of the upper intermediate products.

(g) Pocket 26 is pushed, i.e. manipulated toward portion ABC of outer drum 31 so the recess defined by points CDEF is covered thereby. Cord-rubber composition 11, 12 of pocket 25 is folded from its position against side wall AB onto the top surface of the materials forming pocket 2(b), as indicated by the curved arrow of FIG. 3(e), so composition sheet 11, 12 extends from point I on the top face of body-ply 17 all the way around the left side (as viewed in FIG. 2) and bottom face of the body-ply and around the periphery of the materials forming pocket 25 to point G on the bottom face of cover-rubber layer 18 via a path defined by points ABCDEF, FIG. 2. The surface of the green bladder is slightly wrapped with inner tube 35 (FIG. 3(e)), while strip rubber 20 (FIG. 2) is adhered to edge portion IJ (FIG. 3(d)) of the bladder, i.e., then inner tube 35 is unwrapped.

(h) Cement is coated on the surface of the bladder formed from members 16–18, woven fabric 19 is adhered thereto, and cover drum 32 is placed on the upper surfaces of woven fabric 19, body drum 30 and outer drum 31 (FIG. 3(f)).

(i) To cure, a hose (not shown) injects compressed air into the bladder before steam is injected. Air and steam are injected simultaneously to cure the bladder; then the bladder pressure is released, after which cover drum 32 and outer drum 31 are separated.

By using the above-described method of the present invention, the shoulder bladder shown in FIG. 2 is obtained. Hence, the bladder of the present invention for manufacturing a tire includes cover-rubber layer 18, body-ply layer 17, inner-rubber member 16 forming the expandable part, and steel cords 13, 14 forming the assembling part, all of which are wrapped together and held in place by cord-rubber composition 11, 12. More particularly, said components 13, 14, 16, 17 and 18 are wrapped by cord-rubber composition 11, 12 from end G to end I of the cord-rubber layer as indicated by the line defined by points G-F-E-D-C-B-A-I. Cord-rubber composition 11, 12 is positioned at an angle of 90° to the perimeter of the remainder of the bladder.

Figure 1A:
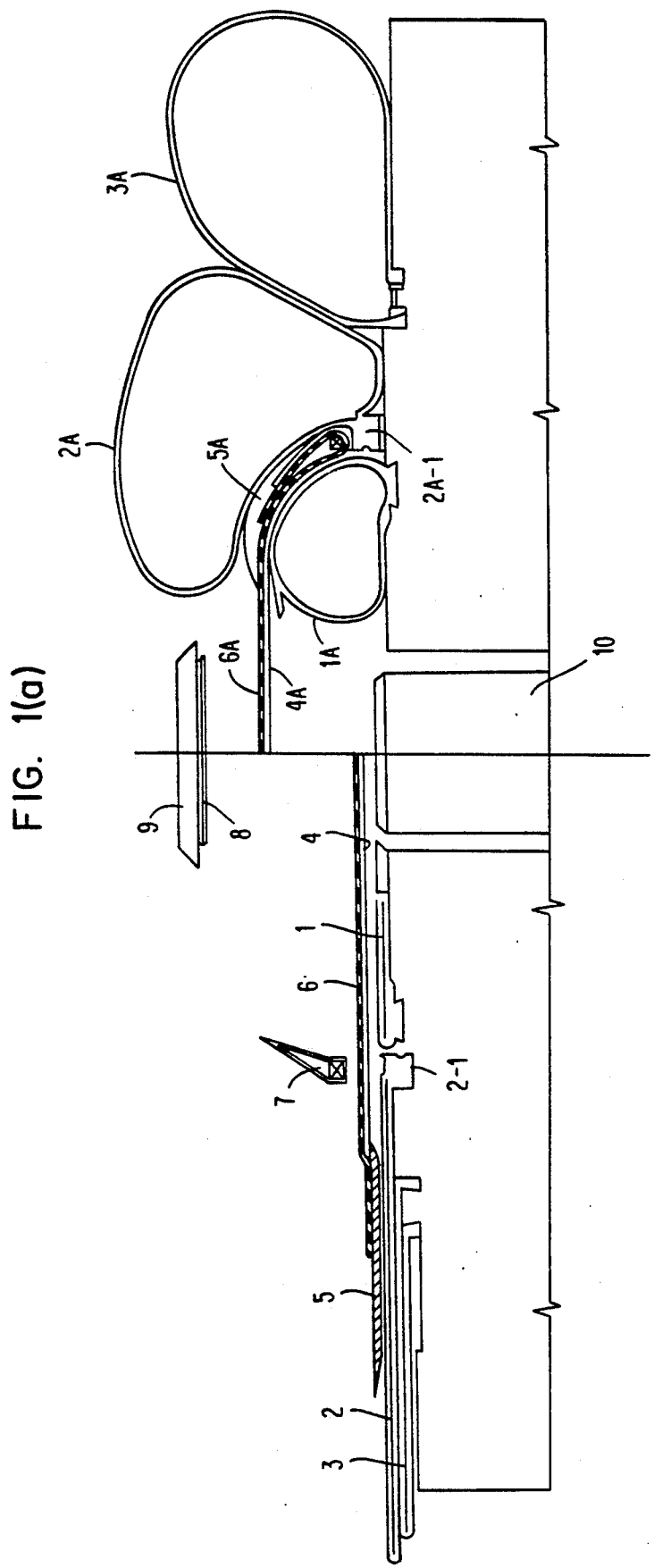
FIG. 1(b) is an exploded longitudinal sectional view of a portion of the structure illustrated in FIG. 1 during molding of a tire bead portion.
Figure 1B:
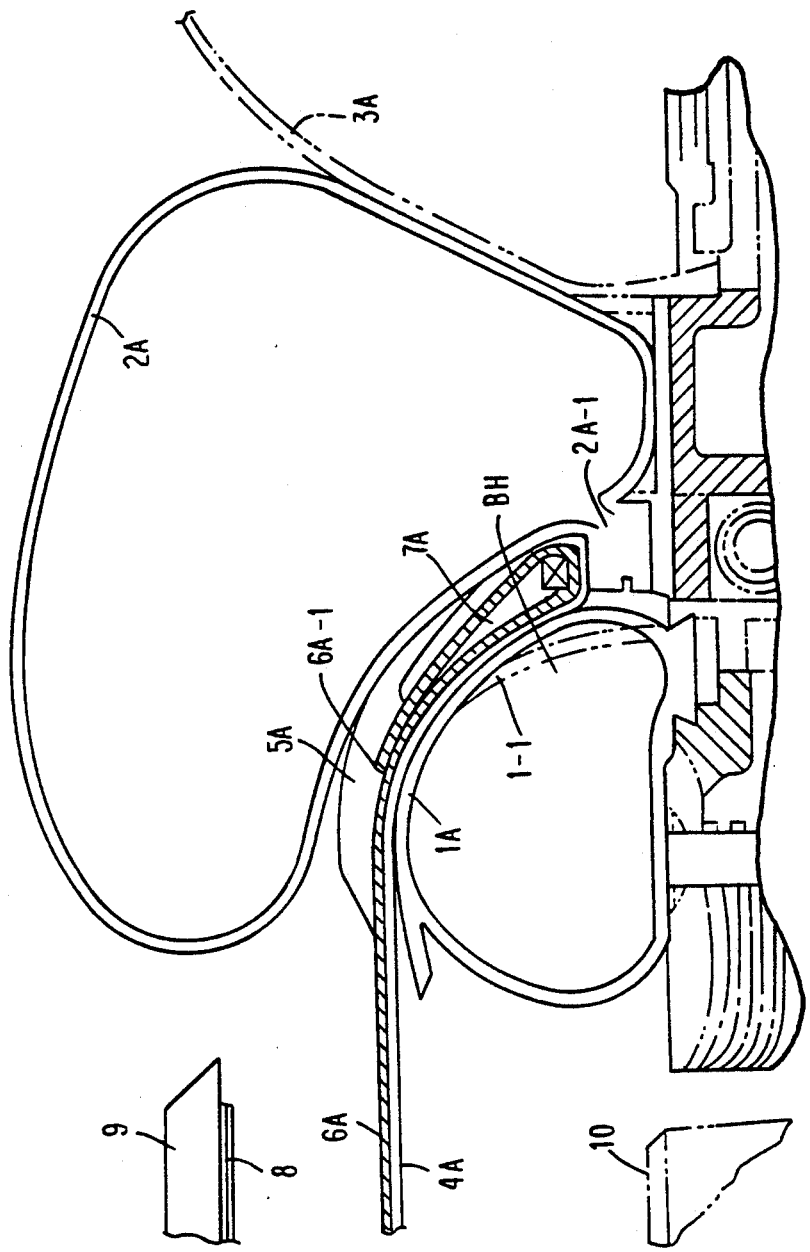

When the bladder is expanded in use during manufacture of a tire, it must retain the form shown in 1A of FIGS. 1(a) and 1(b) so it abuts firmly between bead apex 7A (FIG. 1(b)) of each green tire to minimize the amount of air escaping from end portion 6A-1 of body ply 6A and bead hump portion BH.

Accordingly, to retain the bladder as above, the gauge of each position of the bladder must be retained uniformly in advance. Thus, the body-ply joint is positioned at the assembling portion of the uninflated shoulder bladder to be positioned at the assembling portion. Consequently, the new bladder improves the quality and function of the prior tire in accordance with the method of the present invention.

While there has been described and illustrated a specific embodiment of the invention, it will be clear that variations in the details of the embodiment specifically illustrated and described may be made without departing from the true spirit and scope of the invention as defined in the appended claims.

We claim:

1. A method of making a shoulder bladder for a tire molder comprising forming a first pocket by inserting a cord-rubber sheet superposed with a metal cord sheet into a recess of a drum assembly having a cavity, the recess being located on a bottom face of the cavity, an end portion of the cord-rubber sheet extending out of the cavity;

forming a second pocket by locating on the drum assembly a structure including a rubber inner sheet superposed with a body ply and a rubber cover sheet so a bottom surface of the structure lies on a surface of and covers and contacts a sheet of the first pocket in the recess, the structure being folded on and secured to itself so an end of a top fold of the structure is secured to a bottom fold of the structure between said end portion of the cord-rubber sheet and a gas passage into the second pocket, manipulating the second pocket so that recess is covered thereby, folding the end portion of the cord-rubber sheet onto a top surface of the second pocket, a green bladder thereby being formed in the drum assembly, coating cement on an upper surface of the green bladder, adhering a woven fabric to the coated upper surface, placing a cover of the drum assembly on the green bladder to cover the cavity to form a chamber where the materials forming the first and second pockets are located, then injecting air and stream into the second pocket to cure the materials of the bladder so (a) the end portion of the cord-rubber sheet is bonded to the second pocket, (b) the superposed sheets forming the first and second pockets are bonded to each other and (c) said end of the structure is bonded to the bottom fold of the structure and the second pocket forms the expandable chamber of the bladder, and adhering a valve stem to the materials forming the second pocket prior to the drum cover being placed on the green bladder.

2. The method of claim 1 wherein the air is compressed and the compressed air and steam are simultaneously injected into the second pocket.

3. The method of claim 1 wherein the valve stem extends into the cavity without extending through the cover.

4. The method of claim 1 wherein the woven fabric is formed of nylon.

* * * * *